United States Patent [19]

Inoue et al.

[11] Patent Number: 5,427,765
[45] Date of Patent: Jun. 27, 1995

[54] METHOD OF PRODUCING ZEOLITE β

[75] Inventors: Takahiko Inoue; Hiroshi Watanabe, both of Yamaguchi, Japan

[73] Assignee: Tosoh Corporation, Yamaguchi, Japan

[21] Appl. No.: 204,570

[22] Filed: Mar. 31, 1994

Related U.S. Application Data

[63] Continuation-in-part of Ser. No. 186,152, Jan. 25, 1994, abandoned.

[30] Foreign Application Priority Data

Feb. 2, 1993 [JP] Japan ................. 5-036246

[51] Int. Cl.$^6$ ............................................. C01B 39/04
[52] U.S. Cl. .................................... 423/705; 423/709; 423/DIG. 27
[58] Field of Search ....... 423/700, 705, 709, DIG. 27; 502/77

[56] References Cited

U.S. PATENT DOCUMENTS

| Re. 28,341 | 2/1975 | Wadlinger et al. | 423/DIG. 27 |
|---|---|---|---|
| 3,308,069 | 3/1967 | Wadlinger et al. | |
| 4,554,145 | 11/1985 | Rubin | 502/77 |
| 4,560,542 | 12/1985 | Robson | 423/DIG. 27 |
| 4,562,055 | 12/1985 | Arika et al. | 423/710 |
| 4,587,115 | 5/1986 | Arika et al. | 423/700 |
| 4,642,226 | 2/1987 | Calvert et al. | 502/77 |
| 4,650,654 | 3/1987 | Arika et al. | 423/700 |
| 4,664,898 | 5/1987 | Arika et al. | 423/700 |
| 4,687,653 | 8/1987 | Arika et al. | 423/700 |
| 5,110,573 | 5/1992 | Johnson | 423/DIG. 27 |
| 5,145,659 | 9/1992 | McWilliams | 423/713 |

FOREIGN PATENT DOCUMENTS

| 0159846 | 10/1985 | European Pat. Off. | |
| 0187522 | 7/1986 | European Pat. Off. | |
| 0261746 | 11/1988 | Germany | 502/77 |

OTHER PUBLICATIONS

Camblor et al Zeolites, 1991, vol. 11, Mar. "Crystallization of zeolite beta: Effect of Na and K ions" pp. 202–210.

Camblor et al Zeolites, 1991, vol. 11, Nov./Dec. "Influence of the synthesis conditions on the crystallizaiton of zeolite beta" pp. 792–797.

Primary Examiner—Mark L. Bell
Assistant Examiner—David Sample
Attorney, Agent, or Firm—Nixon & Vanderhye

[57] ABSTRACT

Zeolite β is prepared by reacting a granular amorphous aluminosilicate, prepared by continuously reacting an aqueous solution of an alkali metal silicate and an aqueous solution containing aluminum for a specific time at a temperature of 0° to 55° C. and pH of 5 to 9 the following at molar ratios

| $SiO_2/Al_2O_3$ | 10:1~200:1 and |
|---|---|
| $M_2O/Al_2O_3$ | 0.8~1.2 | where M means an alkali metal contacting it with alkali metal hydroxide tetraethylammonium compound and water at molar ratios of

| $SiO_2/Al_2O_3$ | 10:1~200:1 and |
|---|---|
| $M_2O/SiO_2$ | 0.01~1, |
| $H_2O/SiO_2$ | 8~30 and |
| $R_2O/SiO_2$ | 0.05~0.7 | where R is tetraethylammonium, for 24 to 120 hours at 70° to 160° C. to crystallize.

4 Claims, 1 Drawing Sheet

METHOD OF PRODUCING ZEOLITE β

CROSS-REFERENCE TO RELATED APPLICATIONS

This application is a continuation-in-part of an earlier application Ser. No. 08/186,152 filed Jan. 25, 1994, now abandoned.

BACKGROUND OF THE INVENTION

The present invention relates to the production of zeolite β useful as an adsorbent or catalyst.

Zeolite β was described for the first time in U.S. Pat. No. 3,308,069. The feature of the synthetic method disclosed here is to have present at the same time tetraethylammonium (R) ions with a silica source, an alumina source, an alkali source and water at a molar ratio of not less than 0.15 as $R_2O/SiO_2$. However, the tetraethylammonium compound is very unstable and it is also expensive.

Japanese Unexamined Patent Publication No. Sho 61-281015 reports that the synthesis of zeolite β is possible even if tetraethylammonium ions are at a $R_2O/SiO_2$ molar ratio as low as 0.01 to 0.1. However, synthesis of zeolite β in a system containing such a small quantity of tetraethylammonium ions may take 6 days for the crystallization period, even if crystallizing is done at 150° C. in the presence of seed crystals.

On the other hand, M. A. Camblor et al produced zeolite β in 30 hours at 135° C. as reported in ZEOLITES, 1991, Vol. 11, p. 202 and p. 792, using amorphous silica, a 40% aqueous solution of tetraethylammonium hydroxide, sodium aluminate, aluminum, sodium hydroxide, potassium hydroxide, etc.

Further attempts to produce zeolite β using other organic compounds in place of tetraethylammonium ions are proposed in Japanese Unexamined Patent Publications No. Sho 60-235714 and No. Sho 60-235715. These publications describe the use of special organic compounds which are rather exotic and are difficult to obtain.

The present invention provides a method in which the amount of tetraethylammonium compound required is less, common raw materials are only necessary as the raw materials, other than tetraethylammonium compound, for the synthesis of zeolite, and yet zeolite β can be produced in a short period of time under mild conditions.

SUMMARY OF THE INVENTION

The invention in one aspect includes a process of preparing zeolite β comprising the steps of first producing granular amorphous aluminosilicate by concurrently and continuously feeding an aqueous solution of alkali metal silicate and an aqueous solution containing aluminum at a fixed ratio while stirring so that the average retention time is 3 to 120 minutes, reacting them at a temperature of 0° to 55° C. and pH of 5 to 9, and separating granular amorphous aluminosilicate composition having ratios of

| | |
|---|---|
| $SiO_2/Al_2O_3$ | 10:1~200:1 and |
| $M_2O/Al_2O_3$ | 0.8~1.2 | where M is an alkali metal, as expressed in terms of molar ratio of oxide. This granular amorphous aluminosilicate is produced in the form of a slurry and is contacted the 24 to 120 hours at 70° to 160° C. with alkali metal hydroxide, a tetraethylammonium compound and water in proportions of

| | |
|---|---|
| $SiO_2/Al_2O_3$ | 10:1~200:1 |
| $M_2O/SiO_2$ | 0.01~1, |
| $H_2O/SiO_2$ | 8~30 and |
| $R_2O/SiO_2$ | 0.05~0.7 | where R indicates tetraethylammonium, as expressed in terms of molar ratio of oxide, to crystallize.

In another embodiment of the invention the granular amorphous aluminosilicate is prepared by mixing together an aqueous solution of alkali metal silicate and an aqueous solution containing aluminum for 5 or more minutes without discharging the reaction liquor and then contacting the recovered product with an alkali metal hydroxide, etc., as described above.

DETAILED DESCRIPTION OF THE INVENTION

Figure 1:
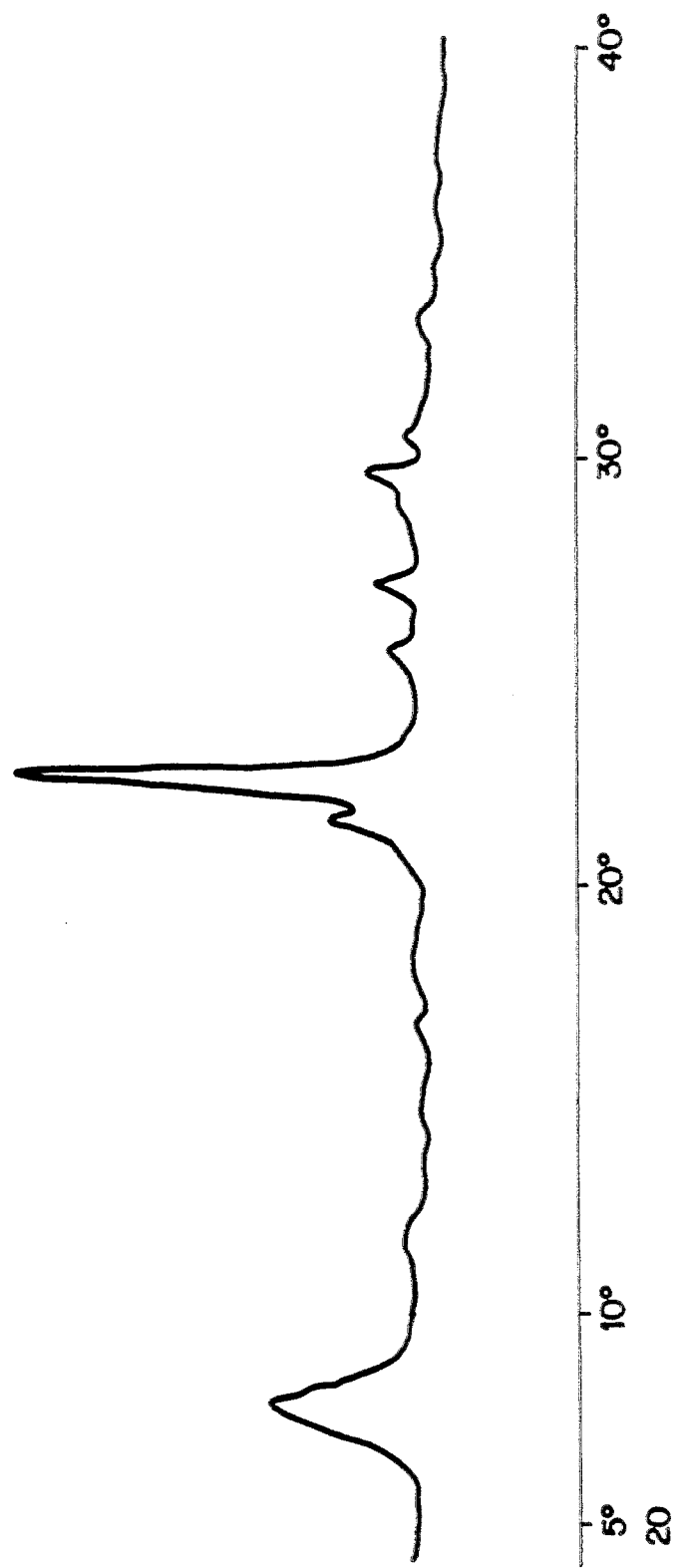
FIG. 1 is an x-ray diffraction diagram of zeolite β obtained in Example 1 using a Cu-K$_{60}$ line.

Aqueous solutions of alkali metal silicate suitable for producing granular amorphous aluminosilicate, i.e. an intermediate in the invention, include aqueous solutions of sodium silicate, potassium silicate, lithium silicate, etc. or an aqueous solution prepared by dissolving silicic acid with an alkali. Suitable aqueous solutions containing aluminum include aqueous solutions of sodium aluminate, potassium aluminate, aluminum chloride, aluminum sulfate, aluminum nitrate, and the like or an aqueous solution prepared by dissolving aluminum hydroxide or aluminum oxide with a mineral acid. The concentration is not particularly restricted although too dilute a concentration only leads to poor productivity.

The pH value of the reaction slurry in the reaction system should be kept between about 5 to 9, preferably about 6 to 8. If the pH value is out of this range, a pasty product results which is difficult to dewater and renders it difficult to achieve a $H_2O/SiO_2$ molar ratio of the mixture of raw materials in the crystallization process of not more than 30. It is desirable to maintain the pH value constant within this range. When the desired value cannot be obtained only by using both of the aqueous solutions, then it may be advisable to directly feed mineral acids, such as hydrochloric acid or sulfuric acid, or alkalies, such as an aqueous solution of sodium hydroxide, in addition to the two aqueous solutions of reactants to the reaction system. Alternatively these pH adjusting solutions may be added to aqueous solutions of reactants to maintain the pH value of reaction system between 5 to 9.

This invention is characterized by the compositional uniformity of the granular amorphous aluminosilicate to be crystallized. Specifically, the aluminum atoms of granular amorphous aluminosilicate are scattered uniformly by oxide units and, for this reason, it appears that the regular arrangement of atoms necessary for the crystallization of zeolite is facilitated. If crystallizing a non-uniform or poorly uniform composition, it will be difficult to synthesize high-purity β zeolite due to the co-production of impurities.

The raw materials for making the granular amorphous alumino-silicate are an aqueous solution of an alkali metal silicate, an aqueous solution containing aluminum and an acid or an alkali for adjusting the pH which is used, if necessary. The granular amorphous aluminosilicate that results has the following composition ratio:

| | |
|---|---|
| $SiO_2/Al_2O_3$ | 10:1~200:1 |
| $M_2O/Al_2O_3$ | 0.8~1.2 | as expressed in terms of the molar oxide ratio.

These ratios are obtained by controlling the feed ratio of the alkali metal silicate and the aluminum-containing solutions in a proportion of 10 to 200 as expressed in terms of the conversion molar ratio of $Si_2O/Al_2O_3$.

If the molar ratio of each oxide does not tall within this range, zeolite $\beta$ of high purity cannot be produced. Both aqueous solutions should be fed concurrently and continuously while stirring to react. If even one of these conditions is not met, uniform granular amorphous aluminosilicate will not be obtained, resulting in the inability to synthesize high-purity $\beta$ zeolite. The reaction may be either fully continuous where the reaction is conducted while discharging the reaction slurry as is the case of an over-flow type reactor, or a batchwise continuous mode where the reaction is conducted without discharging the reaction slurry.

In either case, the reaction temperature should be between about 0° to 55° C. and preferably about 25° to 50° C. Also, the average retention time in the reactor in the fully continuous mode should be about 3 to 120 minutes, preferably about 3 to 60 minutes; the raw material-feeding time in the case of the batchwise continuous mode should be at least 5 minutes, preferably 30 to 120 minutes.

The reaction temperature is primarily a factor determining the reactivity of the amorphous aluminosilicate so prepared. With an increase in this, the amorphous aluminosilicate obtained becomes densified leading to poor reactivity. In a granular amorphous aluminosilicate obtained at a reaction temperature exceeding 55° C., the regions of $M_2O/SiO_2$ molar ratio and $SiO_2/Al_2O_3$ molar ratio, where zeolite $\beta$ is produced, become very narrow. Even if synthesis is possible in those narrow production regions, 160 hours or more time is necessary for crystallization time and this too results in decreased productivity. To shorten the crystallization time, is possible to raise the crystallization temperature. However, the tetraethylammonium ion used as an organic mineralizer is a decomposable substance. For example, when the zeolite $\beta$ is crystallized at 160° C., the inner pressure of the autoclave reaches 35 $kgf/cm^2$ or higher requiring a costly investment in equipment. If the reaction temperature is too low, homogeneous phase granular amorphous aluminosilicate is difficult to obtain. Although the amorphous aluminosilicate deposited at such a low temperature may be highly reactive, it is pasty and is difficult to dewater, hence it becomes difficult to attain an $H_2O/SiO_2$ molar ratio of the mixture of raw materials in the crystallization process of not more than 30, also resulting in poor production. For these reasons the reaction temperature should be about 0° C. or higher and preferably about 25° C. or higher. Moreover, processing below 25° C. requires cooling equipment for the reactor.

The reaction time is primarily a factor determining the state of particles of amorphous aluminosilicate. If the reaction time is too short as the case when the average retention time in the fully continuous mode is shorter than 3 minutes, or the case when the raw material-feeding time in the batchwise continuous mode is shorter than 5 minutes, the proportion of fine particles smaller than 1 $\mu$ will increase, the viscosity of the slurry obtained will increase, the loading in the filtration and washing processes will increase abruptly to remarkably decrease production efficiency and further the concentration of solids in the crystallization process will decrease as well, thereby reducing the overall production efficiency of zeolite $\beta$. However, even if the average retention time is longer than 120 minutes in the case of the fully continuous mode, additional improvement in the particle size of amorphous aluminosilicate cannot be expected, which is nothing but enlarging the reactor more than necessary to decrease productivity. Usually, the average retention time is 60 minutes.

With the granular amorphous aluminosilicate obtained in the manner described above, alkali metal hydroxide, tetraethylammonium compound and water are mixed to prepare a mixture of raw materials. The composition of the mixture of raw materials at this time should be:

| | |
|---|---|
| $SiO_2/Al_2O_3$ | 10:1~200:1 |
| $M_2O/SiO_2$ | 0.01~1, |
| $H_2O/SiO_2$ | 8~30 and |
| $R_2O/SiO_2$ | 0.05~0.7 | expressed in terms of the molar ratio of oxide.

Suitable alkali metal hydroxides are sodium hydroxide, potassium hydroxide and mixtures thereof.

The $SiO_2/Al_2O_3$ molar ratio of the mixture of raw materials should be 10:1 to 200:1 and the $M_2O/SiO_2$ molar ratio 0.01 to 1. This is because of that, if both of these conditions are not satisfied, high-purity zeolite $\beta$ cannot be obtained.

The $SiO_2/Al_2O_3$ molar ratio of zeolite $\beta$ produced is determined by the $SiO_2/Al_2O_3$ molar ratio and $M_2O/SiO_2$ molar ratio of the mixture of raw materials. Even if the $M_2O/SiO_2$ molar ratio of the mixture of raw materials is constant, the crystal size of zeolite $\beta$ and the $SiO_2/Al_2O_3$ molar ratio thereof can be microadjusted by the ratio of alkali metal or the crystallization temperature. For example, if the $SiO_2/Al_2O_3$ molar ratio of the mixture of raw materials is kept constant and the $M_2O/SiO_2$ molar ratio is increased, then the $SiO_2/Al_2O_3$ molar ratio of zeolite $\beta$ is lowered. Also even if the $M_2O/SiO_2$ molar ratio is constant, the crystal size of zeolite $\beta$ becomes larger if making, for example, the $K_2O/(K_2O+Na_2O)$ molar ratio higher.

Even if the $R_2O/SiO_2$ molar ratio is less than 0.05, the synthesis of zeolite $\beta$ is possible, but the crystallization velocity ends up decreasing remarkably. If the ratio exceeds 0.7, the crystallization time still cannot be shortened.

Water is not an important factor in determining whether zeolite $\beta$ is produced or not. However, as the $H_2O/SiO_2$ molar ratio becomes higher, the concentration of solids in the slurry decreases leading to decreased yield of zeolite $\beta$ per unit weight of slurry. On the other hand, if the ratio is too low, stirring of the mixture slurry of raw materials will become difficult.

The addition of seed crystals of zeolite $\beta$ to the mixture of raw materials facilitates control of the crystal diameter of zeolite $\beta$ produced and the crystallization time is shortened. The amount of seed crystals added to the mixture of raw materials is desirably within range from about 0.01 to 10 wt. % preferably from abut 0.05 to 1 wt. %, of the raw materials on a dry weight basis. If the addition of seed crystals is less than 0.01 wt. %, there is little effect. Also even if the seed crystals are added in amount more than 10 wt % there is no significant improvement in controlling crystal diameter and shortening of synthesis time. The crystal diameter of zeolite $\beta$ to be used as seed crystals is preferably around 0.5 to 1 $\mu$ and each crystal is desirably in the dispersed state. When only aggregates of crystals can be prepared, it is helpful to first pulverize them in ball mill or similar device. Although the $SiO_2/Al_2O_3$ molar ratio of zeolite $\beta$ to be used as seed crystals is not an important factor, if one uses crystals with $SiO_2Al_2O_3$ molar ratio approximately the same as that of zeolite $\beta$ to be produced, zeolite $\beta$ with a uniform $SiO_2/Al_2O_3$ molar ratio can be obtained as a product. Seed crystals are conveniently added so that they are uniformly dispersed into the mixture of raw materials. As a practical matter the seed crystals may be added into the mixture of raw materials and mixed thoroughly by stirring.

The crystallization is performed in an autoclave at a temperature of about 70° to 160° C. and for a period of 24 to 120 hours. Crystallization is possible both in the stationary state and in the stirring state. Industrially, crystallization while stirring is desirable from the aspect of heat transfer. The stirring intensity at the time of crystallization under stirring is only necessary to avoid sedimenting the solids in the mixture of raw materials and does not require excessive stirring.

After the completion of crystallization, zeolite $\beta$ is separated from slurry, washed to remove surplus alkali attached to and remaining on the crystals, and then dried, thereby providing high-purity zeolite $\beta$.

Zeolite $\beta$ obtained as described above may be subjected to calcination, ion-exchange, etc., if necessary, to prepare a catalyst, adsorbent or molecular sieve.

In accordance with the invention, it is possible to produce zeolite $\beta$ stably and reproducibly from a small quantity of a tetraethylammonium compound and easily available industrial raw materials and yet under mild conditions and within a short period of time.

The use of seed crystals makes it possible to control crystal diameter and shorten synthesis time, allowing economical production of zeolite $\beta$ useful as a catalyst, adsorbent and molecular sieve.

The invention is further explained with reference to the following examples.

Preparation of homogeneous phase compound of granular amorphous aluminosilicate.

Into an overflow type reactor (real volume 4.8 L) while being stirred, an aqueous solution of sodium silicate ($SiO_2$ 130 g/L, $Na_2O$ 41.8 g/L and $Al_2O_3$ 0.05 g/L) and an aqueous solution of aluminum sulfate ($Al_2O_3$ 21.3 g/L and $SO_4$ 240 g/L) were led concurrently at flow rates of 18.2 L/Hr and 4.5 L/Hr, respectively, and reacted while stirring to obtain a slurry-like product. At this time, the average retention time of slurry was 12.5 minutes. Supply of the aqueous solution of sodium silicate was microadjusted so that the pH value in reactor was between 6 and 8 during the reaction and the temperature of reactor was kept at 40° C.

The slurry-like product overflowing from the reactor was dewatered through a Nutsche filter and then washed to obtain granular amorphous aluminosilicate A.

The $SO^{2-}$ ion in the granular amorphous aluminosilicate was less than 1000 ppm and the powder x-ray diffraction test showed it to be amorphous.

Further, by varying the conditions, granular amorphous aluminosilicates B, C and D were obtained.

The compositions of aqueous solution of sodium silicate and aqueous solution of aluminum sulfate, reaction conditions and compositions of granular amorphous aluminosilicates obtained at these times are shown in Table 1 and Table 2.

Synthesis of zeolite $\beta$

EXAMPLE 1

In a 2.0 L beaker, 284 g of wet cake (water content 70 wt. %) of granular amorphous aluminosilicate A, 1.5 of solid sodium hydroxide, 3.5 g of solid potassium hydroxide and 480 g of 20 wt. % aqueous solution of tetraethylammonium hydroxide were stirred for 30 minutes to prepare a mixture of raw materials. This mixture of raw materials was placed in a 1 L autoclave and crystallized for 120 hours at 135° C. under stirring at a peripheral speed of 0.8 m/sec.

The reaction product was submitted to solid-liquid separation and, after being washed with warm water of 70° C., he solids were dried overnight at 110° C. to obtain zeolite $\beta$.

EXAMPLE 2

In a 2.0 L beaker, 295 g of wet cake (water content 72 wt. %) of granular amorphous aluminosilicate B, 0.26 g of solid sodium hydroxide, 7.45 g of solid potassium hydroxide and 497 g of 20 wt. % aqueous solution of tetraethylammonium hydroxide were stirred for 30 minutes to prepare a mixture of raw materials. A procedure similar to Example 1 was used to obtain zeolite $\beta$.

EXAMPLE 3

Except that 4 g of zeolite $\beta$ obtained in Example 1 were added as seed crystals and the crystallization time was 48 hours, a procedure similar to Example 1 was used to obtain Zeolite $\beta$.

EXAMPLE 4

In a 2.0 L beaker, 237 g of wet cake (water content 60 wt. %) of granular amorphous aluminosilicate C, 1.1 g of solid sodium hydroxide, 7.4 g of solid potassium hydroxide and 554 g of 20 wt. % aqueous solution of tetraethylammonium hydroxide were stirred for 30 minutes to prepare a mixture of raw materials. A procedure similar to Example 1 was used to obtain zeolite $\beta$.

EXAMPLE 5

In a 2.0 L beaker, 285 g of wet cake (water content 70 wt. %) of granular amorphous aluminosilicate A, 1.4 g of solid potassium hydroxide, 481 g of 20 wt. % aqueous solution of tetraethylammonium hydroxide were stirred for 30 minutes to prepare a mixture of raw materials. A procedure similar to Example 1 was used to obtain zeolite $\beta$.

EXAMPLE 6

Except that, to 334 g of wet cake (water content 70 wt. %) of granular amorphous aluminosilicate A, 6.3 g of solid sodium hydroxide, 460 g of 20 wt. % aqueous solution of tetraethylammonium hydroxide and 4 g of zeolite $\beta$ obtained in Example 1 as seed crystals were added and the crystallization time was 48 hours, a procedure similar to Example 1 was carried out to obtain zeolite β.

EXAMPLE 7

Except that, to 382 g of wet cake (water content 70 wt. %) of granular amorphous aluminosilicate A, 7.1 g of solid sodium hydroxide, 229 g of pure water, 131 g of 20 wt. % aqueous solution of tetraethylammonium hydroxide and 4 g of zeolite β obtained in Example 1 as seed crystals were added, and the crystallization temperature was 150° C. and crystallization time was 72 hours, a procedure similar to Example 1 was carried out to obtain zeolite β.

Comparative Example 1

In a 2.0 L beaker. 105.2 g of wet cake (water content 46 wt. %) of granular amorphous aluminosilicate D, 1.3 g of solid sodium hydroxide, 2.3 g of solid potassium hydroxide and 641.3 g of 10 wt. % aqueous solution of tetraethylammonium hydroxide were stirred for 30 minutes to prepare a mixture of raw materials. This mixture of raw materials was placed in a 1 L autoclave and crystallized for 140 hours at 160° C. while stirring at a peripheral speed of 0.8 m/sec.

The reaction product was submitted to soli-liquid separation and, after washed with warm water of 70° C., the solids were dried overnight at 110° C. to obtain zeolite β.

Comparative Example 2

In a 2 L beaker, 736 g of 20 wt. % aqueous solution of tetraethylammonium hydroxide were placed and 3.1 g of sodium aluminate (Na$_2$O 26.3 wt. %, Al$_2$O$_3$ 43.2 wt. %), 13.5 g of solid sodium hydroxide and 137 g of amorphous silica powder (made by Nippon Silica Kogyo K. K, trade name: Nipsil, SiO$_2$ 87.7 wt. %, Al$_2$O$_3$ 0.5 wt. % were mixed under stirring.

This mixture of raw materials was placed in a 1 L autoclave and crystallized for 96 hours at 150° C. under stationary condition. The reaction product was submitted to solid-liquid separation and, after being washed with warm water at 70° C., the solids were dried overnight at 110° C. to obtain zeolite β. Amorphous silica powder is costly and even when this material is used, the desired purity cannot be obtained unless the process is operated at high pressures.

The composition of the mixture of raw materials, crystallizing conditions and purity of product as determined by powder x-ray diffraction in each example above are shown in Table 3 and Table 4. The molar ratio of reactants is given in Table 2A and Table 2B.

TABLE 1

| | Aq. solution of sodium silicate | | | | Aq. solution of aluminum sulfate | | |
|---|---|---|---|---|---|---|---|
| | SiO$_2$ g/L | Na$_2$O g/L | Al$_2$O$_3$ g/L | Flow rate L/Hr | Al$_2$O$_3$ g/L | SO$_4$ g/L | Flow rate L/Hr |
| A | 130 | 41.8 | 0.05 | 18.2 | 21.3 | 240 | 4.5 |
| B | 130 | 41.8 | 0.05 | 18.2 | 10.8 | 256 | 4.5 |
| C | 130 | 41.8 | 0.05 | 9 | 10.8 | 256 | 2.3 |
| D | 130 | 41.8 | 0.05 | 9 | 17.2 | 247 | 2.3 |

TABLE 2

| | Ave. retention time min | Temperature °C. | Granular amorphous aluminosilicate (wt. %) | | | |
|---|---|---|---|---|---|---|
| | | | Na$_2$O | Al$_2$O$_3$ Dry basis | SiO$_2$ | Water content wet basis |
| A | 12.5 | 40 | 2.61 | 3.85 | 93.5 | 70 |
| B | 12.5 | 40 | 1.56 | 1.90 | 96.7 | 72 |
| C | 30 | 40 | 1.81 | 1.98 | 96.4 | 60.5 |
| D | 30 | 60 | 2.17 | 3.13 | 94.7 | 46 |

TABLE 2A

| | SiO$_2$/Al$_2$O$_3$ | M$_2$O/Al$_2$O$_3$ |
|---|---|---|
| A | 41.2 | 1.10 |
| B | 86.4 | 1.12 |
| C | 82.6 | 1.10 |
| D | 51.4 | 1.14 |

TABLE 3

| | Granular salt | Composition of mixture of raw materials | | | | | | Seed Crystals wt. % | SiO$_2$/Al$_2$O$_3$ | M$_2$O/SiO$_2$ | H$_2$/SiO$_2$ | R$_2$O/SiO$_2$ |
|---|---|---|---|---|---|---|---|---|---|---|---|---|
| | (%) | Na$_2$O | K$_2$O | R$_2$O | Al$_2$O$_3$ | SiO$_2$ | H$_2$O | | | | | |
| Example | | | | | | | | | | | | |
| 1 | A | 1.60 | 0.80 | 10.0 | 1 | 41.2 | 991 | — | 41.2 | 0.058 | 24.1 | 0.243 |
| 2 | B | 1.55 | 3.63 | 21.6 | 1 | 86.4 | 1100 | — | 86.4 | 0.060 | 25.5 | 0.250 |
| 3 | B | 1.55 | 3.63 | 21.6 | 1 | 86.4 | 2200 | 0.5 | 86.4 | 0.060 | 25.5 | 0.250 |
| 4 | C | 1.88 | 3.10 | 20.7 | 1 | 82.6 | 1817 | — | 82.6 | 0.060 | 22.0 | 0.250 |
| 5 | A | 1.11 | 0.30 | 10.1 | 1 | 41.2 | 991 | — | 41.2 | 0.034 | 24.1 | 0.245 |
| 6 | A | 3.09 | — | 8.3 | 1 | 41.2 | 990 | 0.5 | 41.2 | 0.075 | 24.0 | 0.201 |
| 7 | A | 3.09 | — | 2.06 | 1 | 41.2 | 778 | 0.5 | 41.2 | 0.075 | 18.8 | 0.050 |
| Comparative example | | | | | | | | | | | | |
| 1 | D | 2.0 | 1.0 | 12.5 | 1 | 51.4 | 2015 | — | 51.4 | 0.058 | 39.2 | 0.243 |
| 2 | — | 9.0 | — | 12.5 | 1 | 100 | 1700 | — | 100 | 0.090 | 17.0 | 0.125 |

TABLE 4

| | Crystallizing Conditions | | | Purity of Zeolite β wt. % |
|---|---|---|---|---|
| | Temperature °C. | Time Hr. | Pressure kgf/cm$^2$ | |
| Example | | | | |
| 1 | 135 | 120 | 18 | 100 |
| 2 | 135 | 120 | 19 | 100 |
| 3 | 135 | 48 | 8 | 98 |
| 4 | 135 | 100 | 15 | 100 |
| 5 | 135 | 120 | 16 | 100 |
| 6 | 135 | 48 | 9 | 100 |
| 7 | 150 | 72 | 7 | 98 |
| Comparative Example | | | | |
| 1 | 160 | 140 | 37 | 50 |
| 2 | 150 | 96 | 30 | 98 |

What is claimed is:

1. A method of producing zeolite β comprising the steps of:

(a) preparing a granular amorphous aluminosilicate by concurrently and continuously feeding an aqueous solution of an alkali metal silicate and an aqueous solution containing aluminum while stirring at a ratio to provide an aluminosilicate composition of $SiO_2/Al_2O_3$ ratio of 10:1~200:1 and a $M_2O/Al_2O_3$ ratio of 0.8~1.2 so that the average reaction time from initiation of the feeding is 3 to 120 minutes, and reacting the aqueous alkali metal silicate and aqueous aluminum solutions at a temperature of 0° to 55° C. and pH of 5 to 9, and thereafter separating the granular amorphous aluminosilicate having composition ratios of

| | |
|---|---|
| $SiO_2/Al_2O_3$ | 10:1~200:1 |
| $M_2O/Al_2O_3$ | 0.8~1.2 | where M is an alkali metal, as expressed in terms of the molar ratio of oxide;

(b) contacting said granular amorphous aluminosilicate with alkali metal hydroxide, tetraethylammonium compound and water in proportions of

| | |
|---|---|
| $SiO_2/Al_2O_3$ | 10:1~200:1 |
| $M_2O/SiO_2$ | 0.01~1, |
| $H_2O/SiO_2$ | 8~30 and |
| $R_2O/SiO_2$ | 0.05~0.7 | where R is tetraethylammonium, as expressed in terms of the molar ratio of oxide, for 24 to 120 hours at 70° to 160° C. to crystallize; and (c) recovering the β zeolite thus produced.

2. The method of claim 1 wherein zeolite β in amounts of 0.01 to 10 wt. % calculated on the sum of granular amorphous aluminosilicate, alkali metal hydroxide and aqueous solution of tetraethylammonium compound is added as seed crystals for crystallization.

3. A method of producing zeolite β comprising the steps of:

(a) preparing a granular amorphous aluminosilicate by concurrently and continuously feeding an aqueous solution of an alkali metal silicate and an aqueous solution containing aluminum over 5 or more than 5 minutes while stirring at a ratio to provide an aluminosilicate composition of $SiO_2/Al_2O_3$ ratio of 10:1~200:1 and a $M_2O/Al_2O_3$ ratio of 0.8~1.2 and at a temperature of 0° to 55° C. an a pH of 5 to 9, and thereafter separating the granular amorphous aluminosilicate having composition ratios of

| | |
|---|---|
| $SiO_2/Al_2O_3$ | 10:1~200:1 and |
| $M_2O/Al_2O_3$ | 0.8~1.2 | as expressed in terms of molar ratio of oxide;

(b) contacting said granular amorphous aluminosilicate with alkali metal hydroxide, tetraethylammonium compound and water in proportions of

| | |
|---|---|
| $SiO_2/Al_2O_3$ | 10:1~200:1 and |
| $M_2O/SiO_2$ | 0.01~1, |
| $H_2O/SiO_2$ | 8~30 and |
| $R_2O/SiO_2$ | 0.05~0.7 | as expressed in terms of molar ratio of oxide, for 24 to 120 hours at 70° to 160° C. to crystallize; and thereafter (c) recovering β zeolite.

4. The method of claim 3 wherein zeolite β in amounts of 0.01 to 10 wt. % calculated on the sum of granular amorphous aluminosilicate, alkali metal hydroxide and aqueous solution of tetraethylammonium compound is added as seed crystals for crystallization.

* * * * *